(12) United States Patent
Warriner (10) Patent No.: US 9,946,481 B2
(45) Date of Patent: Apr. 17, 2018

(54) DYNAMIC POWER THROTTLING IN SOLID STATE DRIVES

(71) Applicant: Toshiba Memory Corporation, Minato-ku, Tokyo (JP)

(72) Inventor: Matthew Warriner, San Jose, CA (US)

(73) Assignee: Toshiba Memory Corporation, Tokyo (JP)

(*) Notice: Subject to any disclaimer, the term of this patent is extended or adjusted under 35 U.S.C. 154(b) by 62 days.

(21) Appl. No.: 14/702,560

(22) Filed: May 1, 2015

(65) Prior Publication Data
US 2016/0320995 A1 Nov. 3, 2016

(51) Int. Cl.
| | | |
|---|---|---|
| *G06F 12/00* | (2006.01) | |
| *G06F 3/06* | (2006.01) | |
| *G06F 1/20* | (2006.01) | |
| *G06F 1/32* | (2006.01) | |

(52) U.S. Cl.
CPC ............ *G06F 3/0625* (2013.01); *G06F 1/206* (2013.01); *G06F 1/3268* (2013.01); *G06F 3/0616* (2013.01); *G06F 3/0659* (2013.01); *G06F 3/0679* (2013.01); *G06F 3/0688* (2013.01); *Y02B 60/1246* (2013.01); *Y02B 60/1275* (2013.01)

(58) Field of Classification Search
None
See application file for complete search history.

(56) References Cited

U.S. PATENT DOCUMENTS

| | | | |
|---|---|---|---|
| 8,862,807 B2 | 10/2014 | Yoon et al. | |
| 2014/0365714 A1* | 12/2014 | Sweere | G06F 12/0246 711/103 |
| 2015/0301744 A1* | 10/2015 | Kim | G06F 3/061 711/103 |
| 2016/0274629 A1* | 9/2016 | Lovicott | G01K 15/00 |

OTHER PUBLICATIONS

NVM Express Revision 1.2.1, pp. 1-217 (Jun. 5, 2016).

* cited by examiner

*Primary Examiner* — Baboucarr Faal
(74) *Attorney, Agent, or Firm* — White & Case LLP (57) ABSTRACT

An apparatus, system, and method is provided to dynamically throttle a solid state drive based on measured local temperature and power measurements. The solid state drive includes a monitoring system to monitor temperature and power. A controller in the solid state drive determines a throttle setting. The controller may be implemented as proportional integral differential (PID) control loop. The throttling may include adjusting the rate of concurrent non-volatile memory operations between a minimum value and a maximum value.

31 Claims, 5 Drawing Sheets

DYNAMIC POWER THROTTLING IN SOLID STATE DRIVES

FIELD OF THE INVENTION

The present invention is generally related to techniques to control the operation of a solid state drive. More particularly, the present invention is related to dynamic temperature and power throttling in a solid state drive.

BACKGROUND OF THE INVENTION

A solid state drive (SSD) typically consists of one or a small set of flash memory controller devices and an array of non-volatile memory, which typically comprises NAND flash memory devices. The SSD also typically includes a volatile memory buffer, comprising Dynamic Random Access Memory (DRAM) memory devices. Each controller of the SSD may control its own array of NAND flash memory devices, arranged in groups, or memory channels, with a separate memory data/address/control bus for each channel.

Each NAND flash memory device of the SSD may consist of one or more semiconductor dies connected to a single memory bus interface on the device. The dies may operate independently; with the restriction that only one die (at a time) may be transferring data to/from the memory controller attached to the memory bus interface.

The operation of an individual non-volatile NAND flash memory device can be split into three distinct main functions: erasure, programming (writing) and reading. Before any writing to the device can occur, the memory cells must be first erased. Data storage in the cells is achieved by storing a charge on an insulated floating gate of a transistor. In order to write new data to a cell, any existing charge must be first removed, which is termed erasure of the cell. In NAND flash memory, cells are erased in large groups called erasure blocks.

Erasure requires a high negative voltage to be applied to the control gate in order to remove the charge from the floating gate (generally achieved by applying a positive voltage to the drain terminal of the transistor and grounding the control gate terminal) via a process known as quantum or Fowler-Nordheim tunneling, where the electrons are 'pulled off' the floating gate. The erase voltage must be applied for some considerable time and the fact that large blocks of memory cells are erased at the same time means that considerable power is consumed for this function.

Writing new data involves the reverse process, whereby applying a high voltage to the control gate and drain while holding the source terminal at 0V, electrons will migrate to the floating gate via a process of hot electron injection. This operation is known as 'programming' and the memory must be programmed in units of pages, where the page is a sub-unit of an erase block. To maintain accuracy for the amount of charge injected, especially for Multi-Level Cell (MLC) type NAND memory, programming may be performed in a series of incremental steps. Nevertheless, the page programming time is generally much less than the block erase time, and with the size of the page being much less than the erase block, the power consumed for programming is much less than for erasure.

Reading of cells that have been programmed is also performed on a page by page basis. However, the voltage which is applied to the control gate is less than that used for erasure and programming, as it is only required to apply a threshold voltage sufficient to determine if the transistor conducts or not, with no movement of charge to or from the floating gate. The reading time is therefore very much less than that required for writing (programming) and very much less power is consumed for this operation than either programming or erasure.

Figure 1:
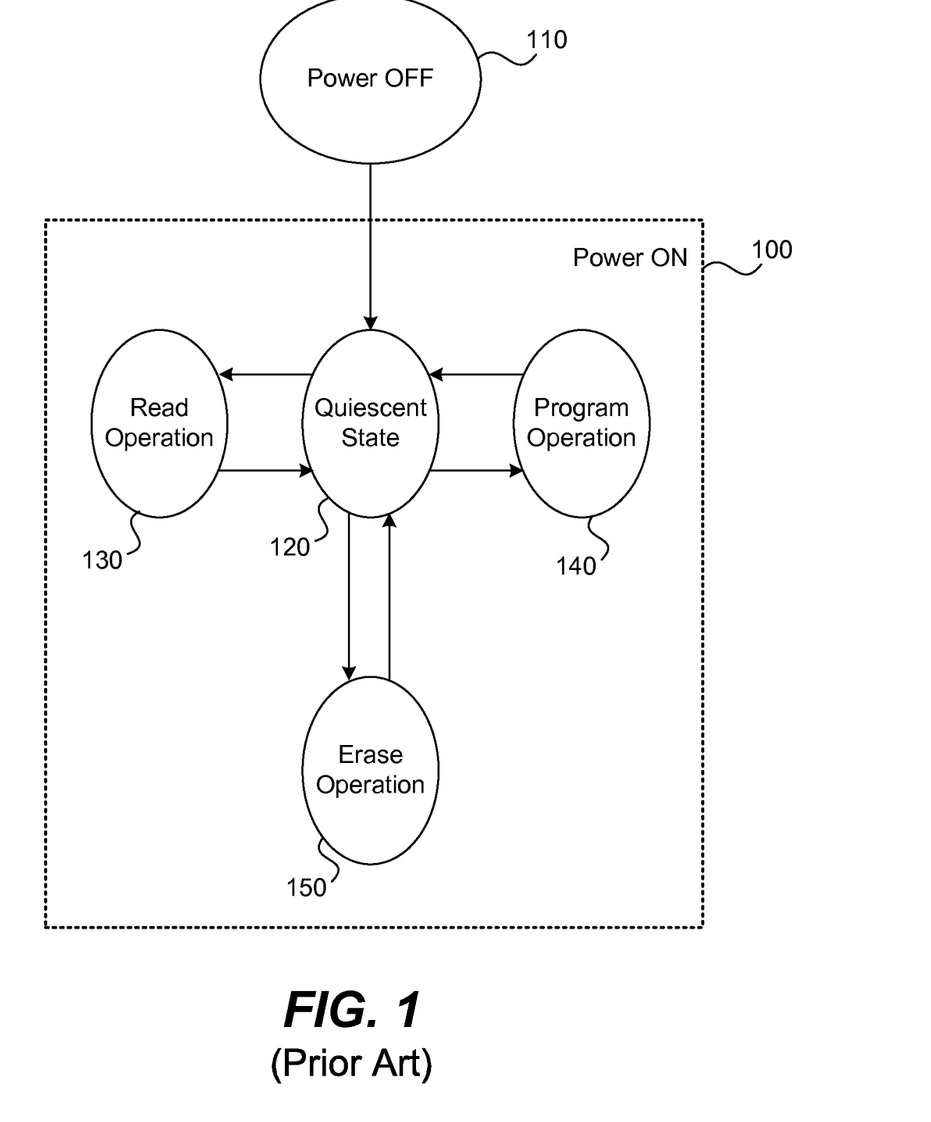
FIG. 1 is a state diagram of a flash memory device.

Referring to FIG. 1, a flash memory device will therefore consume power according to the power states of the individual dies which make up the device, where the states may be one of: power off 110, quiescent 120 (also known as the pre-charge state), program 140, erase 150, or read 130. Given that each of the dies may be in a different state, there are more than four different power states for the device as a whole (some combinations not being possible due to the device as a whole only supporting one read or write data transfer operation to be active at any time).

The flash memory devices are attached to a flash memory controller which may support several memory data/address/control buses (known as channels) where several memory devices may be attached to each channel. Only one data read/write transfer may be in progress at any time to one device on the channel, but the other devices on the channel may be conducting an operation, such as erase (that does not require a memory bus data transfer) at the same time, or operations that require a short data transfer followed by a longer period of no data transfer, such as program, may be interleaved or offset in time such that they may proceed in parallel.

Therefore, at any given time, there may be a read/write (program) data transfer operation in progress on each of the memory controller channels, plus several simultaneous or interleaved operations to multiple devices or dies. The power consumption of the flash memory array will therefore be heavily dependent on the read/write workload of the SSD as a whole, which will vary according to the rates of reading and writing, the size of the data being transferred with each read and write, and which locations are being read or written to.

The overall power consumption of an SSD will depend on the total of the individual power consumptions of the individual flash memory devices in the flash memory array, plus the power consumption of the flash controller, the DRAM buffer, and power losses in power supply and voltage regulation circuitry. This overall value will be largely dominated by the power consumed by the flash memory array, with the next largest contribution from the flash controller, and lastly the DRAM buffer.

The power consumed by the flash memory array is spread across many individual devices, so the power dissipation by individual flash memory devices is not normally a concern. However, the flash memory controller will be the largest single power dissipating device, and while a heat sink is not normally required for the controller, excessive power consumption may cause problems with dissipation of heat and the device may not be able to regulate its temperature under a defined maximum if subjected to a particularly demanding workload.

Figure 2:
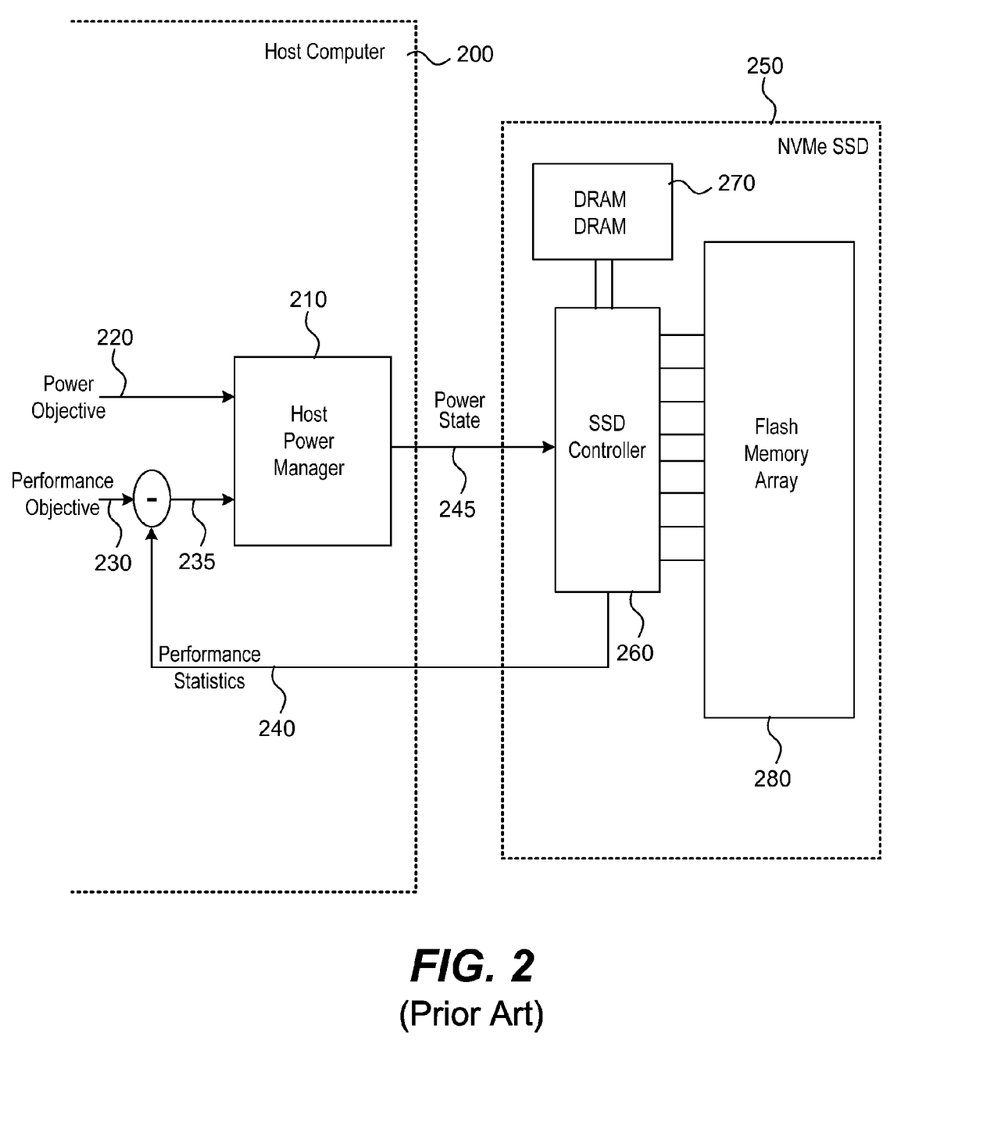
FIG. 2 illustrates a conventional solid state drive compatible with the NVMe specification.

In the prior art, the host computer may be provided with a limited ability to implement power management. An example of a power management system is in the NVM Express (NVMe) 1.1b Specification, published by NVM Express, Inc. in July 2014, the contents of which are hereby incorporated by reference. The NVM Express permits a power manager associated with a host (e.g., host software) to modify an NVM express power state, as shown in FIG. 2. The host computer can dynamically modify the NVM Express SSD's power state to best satisfy changing power and performance objectives.

As shown in FIG. 2, the Host Computer 200 is connected to an NVMe SSD 250 and has a Host Power Manager application program 210 which takes a Power Objective input 220 and an input 235 which is the difference between a Performance Objective 230 and Performance Statistics 240 reported by the SSD controller 260. The Host Power Manager 210 then issues a command to set the Power State 245 of the SSD Controller 260.

The power states are discrete power states, and the number of power states implemented by a controller is returned in the Number of Power States Supported (NPSS) field in the Identify Controller data structure. A controller has to support at least one power state and may optionally support up to a total of 32 power states.

Associated with each power state are a number of parameters, as shown in Table 1:

TABLE 1

| Power State | Maximum Power (MP) | Entry Latency (ENTLAT) | Exit Latency (EXLAT) | Relative Read Throughput (RRT) | Relative Read Latency (RRL) | Relative Write Throughput (RWT) | Relative Write Latency (RWL) |
|---|---|---|---|---|---|---|---|
| 0 | 25 W | 5 μs | 5 μs | 0 | 0 | 0 | 0 |
| 1 | 18 W | 5 μs | 7 μs | 0 | 0 | 1 | 0 |
| 2 | 18 W | 5 μs | 8 μs | 1 | 0 | 0 | 0 |
| 3 | 15 W | 20 μs | 15 μs | 2 | 0 | 2 | 0 |
| 4 | 10 W | 20 μs | 30 μs | 1 | 1 | 3 | 0 |
| 5 | 8 W | 50 μs | 50 μs | 2 | 2 | 4 | 0 |
| 6 | 5 W | 20 μs | 5000 μs | 4 | 3 | 5 | 1 |

The host can then dynamically change the power state according to the required performance and power objectives in relation to the measured performance statistics. This external power management is not designed to be a replacement for the autonomous power management conducted by the controller internal to the SSD. In particular, the NVMe Specification states that "[t]his power management mechanism is meant to complement and not replace autonomous power management performed by a controller."

However, in the prior art, the SSD controller was typically provided with only an extremely limited capability to adjust the power consumption of the SSD. Methods to achieve this in the prior art have included inserting a delay between received workload commands from the host in order to reduce the rate of execution of the commands by the SSD. However, a problem with this technique is that there may be a maximum limit to the delay that can be inserted. For example, U.S. Pat. No. 8,862,807 describes a technique to calculate an idle time based on previous workload and insert the idle time between SSD operations. However, in addition to any inherent limitations is inserting a delay, the control technique is also comparatively primitive. Among other problems with this approach, the future workload behavior is based on previous workload behavior being collected such that the approach is not sufficiently flexible or agile enough to cope with continuously varying workloads or variations in workload over short term periods. Thus, any local autonomous control can be coarse and very limited in nature.

SUMMARY OF THE INVENTION

A solid state drive (SSD) controller is provided with a throttling controller to adapt the operation of the SSD based on temperature and power measurements. The SSD monitors local temperature and power and autonomously throttles a rate of at least one type of non-volatile memory operations based on the local temperature and power measurements.

In one embodiment, the solid state drive includes a monitoring system to monitor temperature and power. A control loop controller in the solid state drive determines a throttle setting. The control loop may be implemented as proportional integral differential (PID) control loop. The throttling may include adjusting the number of concurrent non-volatile memory operations per unit time between a minimum value and a maximum value.

The SSD with autonomous control based on monitored temperature and power may be used in different applications. One application is in environments with multiple SSDs in close proximity or otherwise subject to an environment with variable temperatures. Another application is in applications in which the host traffic is variable and has the potential to create a temperature spike. Yet another application is to provide autonomous control of the SSD in applications in which a host computer provides some limited set of power setting commands and the SSD is expected to include, in a complementary fashion, local autonomous control.

DETAILED DESCRIPTION

Figure 3:
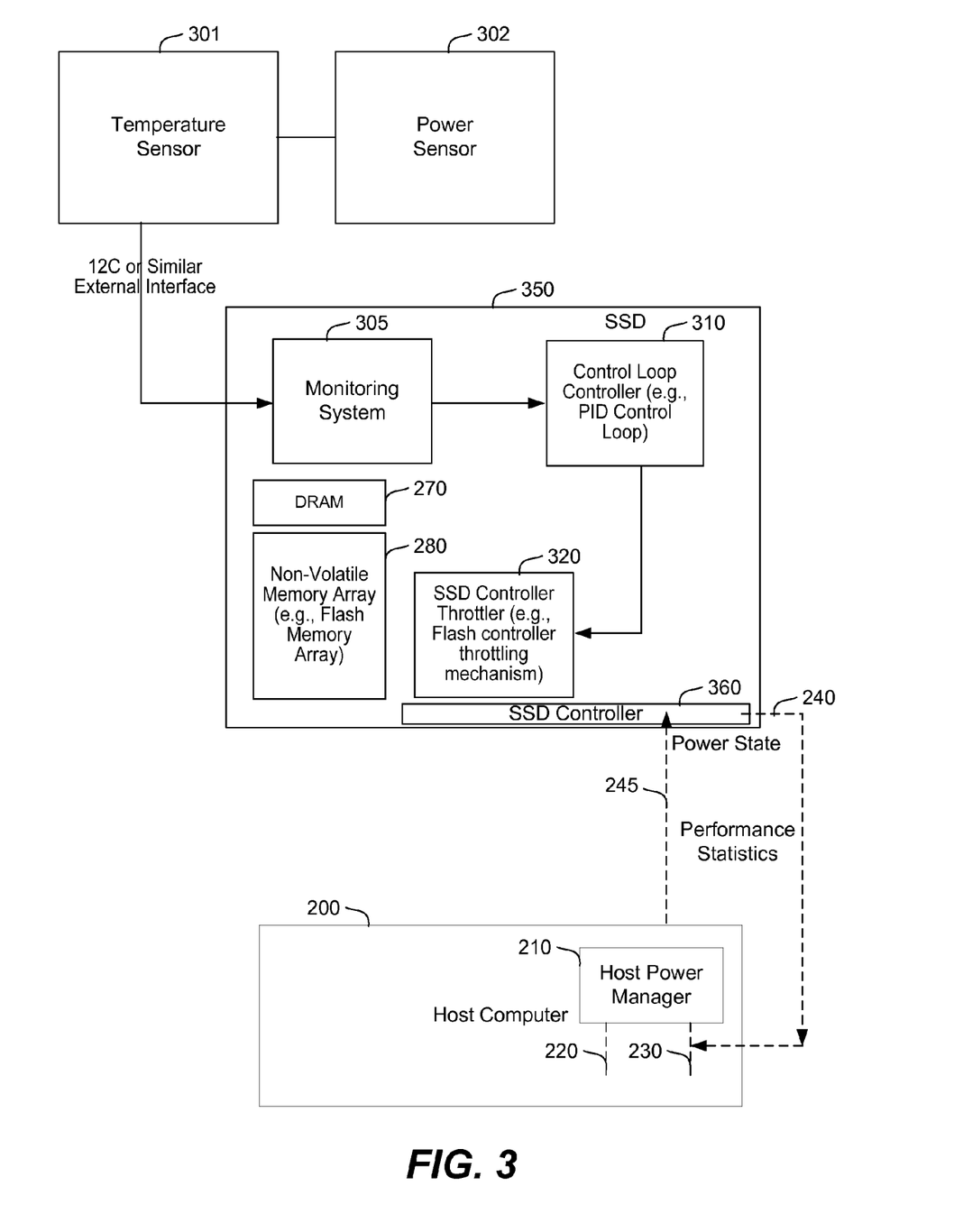
FIG. 3 illustrates a solid state drive in accordance with an embodiment of the present invention.

FIG. 3 illustrates a solid state drive (SSD) 350 in accordance with an embodiment of the present invention. The SSD includes an SSD controller 360, non-volatile memory array 280, DRAM 270. The non-volatile memory array may, for example, be a flash memory array. For example, the non-volatile memory array may be implemented as a NAND flash memory array. A memory bus (not shown) includes channels between the SSD controller 360 and the non-volatile memory array 280.

One aspect of the embodiment of FIG. 3 is that the SSD 350 autonomously makes a dynamic determination of the amount of throttling required of the number of concurrent non-volatile memory operations per unit time to reduce the temperature or power to the required levels to protect the device from overheating and to keep it under a power requirement of the host platform. Additionally, in one embodiment, the throttling can be performed at finer levels of detail, such as imposing rate limits for specific types of operations (e.g., read, erase, program) for each memory bus channel.

The SSD may be provided with default parameters to implement autonomous control of temperature and power. However, more generally, the SSD may receive one or more inputs from a host or other controlling entity, such as a target temperature range or target power setting. As indicated by the dashed boxes and lines, the SSD may optionally be configured to support operation in accordance with the NVMe specification in which the host has the capability to provide power state commands and receive performance statistics. Thus, the dynamic and autonomous throttling may optionally be implemented to be complementary to those of the NVMe specification in which a host provides external power state commands.

The SSD takes measurements of power and temperature provided by a local temperature sensor 301 and a power sensor 302. In the case of the power sensor 302, it will be understood that power may be directly measured or inferred from electrical measurements such as current and voltage of the SSD. However, it will be understood that in alternate embodiments the power could be inferred based on electrical measurements of a subset of SSD components. More generally, any technique to determine power of the SSD may be utilized by the power sensor 302. The temperature sensor and the power sensor may be implemented as external sensors connected to the SSD by an I2C (I squared C or I2C) or similar bus. However, it will be understood that in theory the temperature and power measurements could be integrated into the SSD, if desired. However, typically, it is often more convenient and cost-effective to utilize external sensors. While single individual sensors are illustrated, it will also be understood that sets of sensors may be utilized and average values from a set of power sensors and a set of temperature sensors utilized.

Additionally, it will be understood that while there may be an average SSD temperature, the temperature will generally vary over an SSD and individual portions of the SSD may be more likely to suffer from overheating than others. Consequently, a choice may be made as to where to sample the temperature to achieve the best performance of the SSD. The temperature may be measured anywhere proximate to the SSD, such as on a heat sink, or in a region near the non-volatile memory array. However, in applications in which heating is a particular problem in a SSD controller, in some applications it may be desirable to measure the temperature as close to the SSD controller as practical.

The SSD 350 includes a monitoring system 305 that may be implemented in SSD firmware. The SSD monitoring system 305 monitors the temperature and power, and in response a control loop controller 310 dynamically makes decisions on a throttle setting to throttle the operation of the non-volatile memory array to keep the temperature and/or power at the required values. In one embodiment, the control loop controller 310 is implemented as a proportional integral differential (PID) control loop. A PID control loop (also known as a PID controller) may be implemented in firmware or software. However, more generally, the control loop controller 310 may be implemented using other control loop techniques known in the art.

A throttling controller 320 receives the throttle setting and in response throttles the operation of the non-volatile memory array 280. In the case of the non-volatile memory being flash memory, the throttling controller 320 implements a flash controller throttling mechanism. The precise flash controller throttling mechanism may depend on the actual flash controller implementation. In one embodiment the throttling mechanism limits the number of concurrent flash operations per unit time across multiple flash memory bus channels controlled by the controller. Moreover, limits may also be applied at a finer level of granularity taking into account the type of operation being performed in each channel. For example, in one embodiment, limits on the number of operations per unit time are implemented in individual channels according to the type of operation being performed on specific channels, such as limits controlling specific reads, writes, and erases on specific channels.

The throttling controller 320, control loop controller 310, and monitoring system 305 may be implemented either as part of the SSD controller 360 or as separate units within the SSD. They may be implemented in hardware or as firmware. As one example, the throttling controller 320, control loop controller 310, and monitoring system 305 may be implemented in an ASIC that includes the SSD controller 360.

Figure 4:
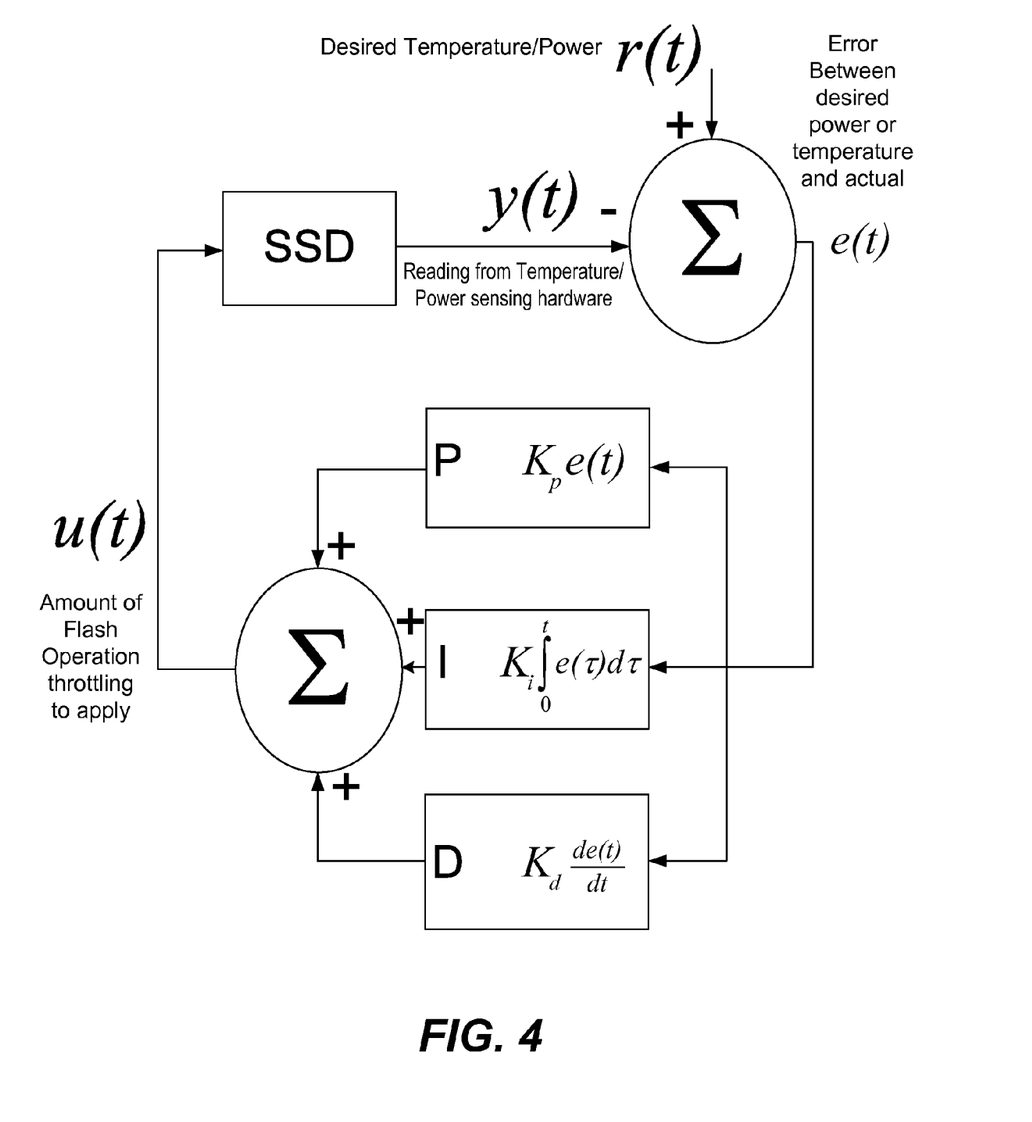
FIG. 4 illustrates aspects of a PID controller in accordance with an embodiment of the present invention.

FIG. 4 illustrates an example of a PID control loop for a flash memory embodiment that determines the amount of flash throttling to apply, where the flash throttling may be a throttling of the rate of concurrent flash operations. The PID controller generates an error value by subtracting the current temperature or power from the desired value. The PID controller performs a calculation that sets the level of throttling to attempt to eliminate the error and move the temperature or power to match the desired value. It achieves this by generating (in addition to the normal error) the integral error (sum of the error over time) and the differential error (rate of change of error) and then multiplies each of them by tuned gain terms that are then summed to generate a value for the amount of flash throttling to perform. If the gain terms are tuned correctly, the system will converge onto a value for the throttling that will keep the temperature or power at the desired value and will adapt to changing situations that are optimal for the current circumstances without over-reacting to disturbances.

By this dynamic approach to the power and temperature throttling, a better fit is achieved than static methods that would just apply a set amount of throttling regardless of the overall state. This approach converges to the optimal amount of throttling for the current situation rather than applying too much or not enough. It also adapts to changing situations if the SSD device continues to get hotter or consumes more power due to some operational or environmental factor. This allows the SSD to maintain as much performance as possible while still working within the required power and temperature constraints.

In one embodiment of a SSD with flash memory, an external temperature sensor and power sensor are polled periodically by a monitoring loop in the SSD's firmware. The PID control loop then uses those values to derive an amount of throttling to apply to the flash to keep the temperature or power at the required value.

In FIG. 4, the SSD has a defined set point (labeled r(t) in the diagram) that is the desired value of power/temperature that the SSD attempts to maintain. The current value of power or temperature and power y(t) is measured and subtracted from the desired value to generate an error value e(t) on the diagram. Using the current error (or proportional error), the integral error (sum of errors) is derived and the derivative error (rate of change of error). A gain term is applied to each error type (Kp Ki and Kd in the diagram) and then the result is summed. This gives the amount of throttling u(t) to move the power or temperature towards the desired value. Over repeated iterations of this system, the output will cause the temperature and power to converge onto desired target values, assuming that it is physically possible. The gain terms (Kp Ki and Kd) can be determined empirically or via a number of tuning methods the most popular of which is Ziegler Nichols tuning.

In one embodiment, a capability to throttle non-volatile memory operations is provided based on temperature, power, or a combination of both temperature and power. In one embodiment separate PID controllers are maintained for both temperature and power. That is a first PID controller is provided for temperature and a second PID controller is provided with power and the two PID controllers operate in parallel with individual gain parameters so they can be tuned for the specific responses desired in each. In one embodiment, the errors and output are calculated in time step fashion once every loop to minimize the performance impact. A rule may be provided to select a throttle setting based on the results of the first and second PID controllers. In one embodiment, in the case where the SSD is using a first PID controller based on temperature and a second PID controller based on power, then the throttle setting uses whichever result has the most throttling. However, more generally, other rules could be applied to base a throttle setting on the combination of the results from the first and second PID controller.

Fine tuning of the PID set points and the gain values may be determined during a development phase to optimize the response. In particular, the fine tuning of the set points and the gain values may be selected to avoid spikes and overshoots. As an illustrative example, in the case of power, optimizing the fine tuning is desirable to avoid spikes and overshoot in temperature.

FIG. 4 illustrates individual factors used in determining u(t), the amount of flash throttling to apply. The amount of throttling, u(t), is given by the following formula:

$$u(t) = MV(t) = K_p e(t) + K_i \int_0^t e(\tau)d(\tau) + K_d \frac{d}{dt}e(t)$$

Figure 5:
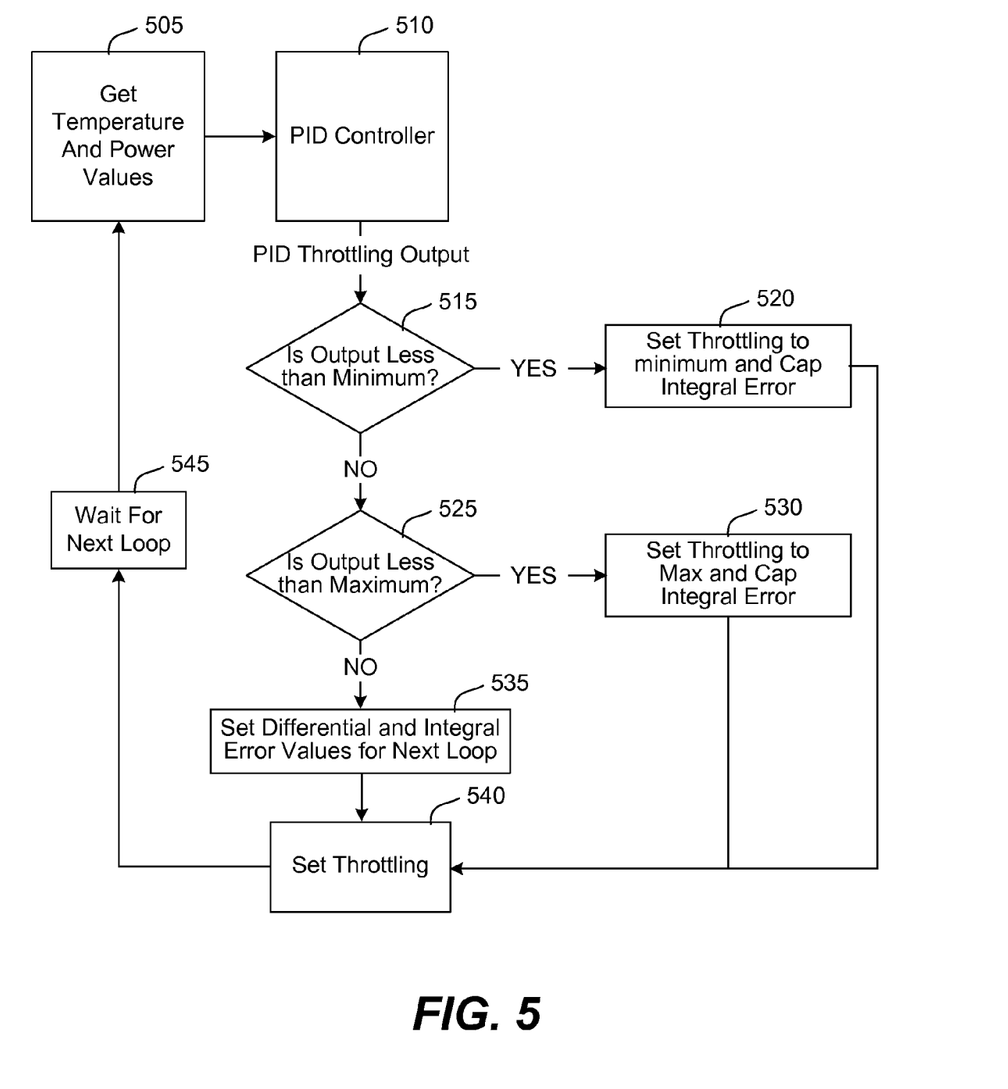
FIG. 5 is a flowchart of a method of PID control of throttling in a solid state drive in accordance with an embodiment of the present invention.

Where:
Kp: Portional Gain, a tuning parameter
Ki: Integral Gain, a tuning parameter
Kd: Differential Gain, a tuning parameter
e: Error=SP−PV
t: Time or instantaneous time (the present)
τ: Variable of Integration; takes on values 0 to the present t FIG. 5 is a flow chart illustrating additional aspects of how the PID controller is used to set the throttling in accordance with an embodiment of the present invention.

At the beginning of each loop, the temperature and power values are polled 505 by the PID controller and the PID controller generated an initial PID throttling output 510. This initial PID throttling output 510 may be capped based on various factors. There are upper and lower limits on the amount of throttling that can be applied in the SSD. In decision block 515, a determination is made whether the PID throttling output is less than a minimum value. The lower limit is set by at least two considerations. First, the number of flash operations can't be reduced below zero. Second, if the flash operations were completely cut off it could cause problems with the host. As a result, a lower limit is set that is above zero and at least equal to a minimum value required for proper operation of the host. There is an upper limit because it is not possible to go beyond full access to the flash.

If the PID throttling output is less than the minimum then in block 520 the throttling is set at the minimum and the integral error is capped. If the output is not less than the minimum, a determination is then made whether the PID throttling output is more than a maximum 525. If it is, then in block 530 the throttling is set to the maximum and the integral error is capped. Otherwise, if the PID throttling output is between the minimum and the maximum, the differential and integral errors are set 535 for the next loop. The output 540 of the set throttling block is used to set the throttling. The process then stores the differential and integral error values and cycles again after the next loop 545.

Capping of the integral errors improves response time. Because of the way the errors are generated, the integral error has to be a capped value to prevent integral windup (the integral term increasing every loop when the system is already at maximum/min throttling), otherwise, there can be a delay to response time while a potentially very large integral error value that has built up is canceled out.

The set throttling value determined for the current loop is applied to limit the flash operations. The error terms are stored for the next loop after a pre-select set time. The throttling mechanism may be selected to be specific to the SSD in question.

Exemplary Application Environments

The power which is consumed by an SSD will not be unlimited, but rather constrained by the form factor being used. For example, PCI Express (PCIe) cards are allowed a maximum power consumption of 25 W for 4 and 8 lane cards or 10 W for 1 lane or half height cards; M.2 form factor SSDs, which support both PCIe and SATA connections, support a maximum power of 8.25 W. Depending on the design of the SSD, in respect the total size of the flash memory array, the number of channels and memory devices allocated per channel, it may be possible for the workload to potentially cause the power consumption of the SSD to exceed the maximum rated power consumption for the form factor in use.

The workload presented to an SSD will be constrained to some degree by the data rate supported by the host interface, for example the 3 Gbps or 6 Gbps raw data rates of a SATA host interface, or the number of PCIe host interface data lanes (which can operate at between 2.5 and 16 G Transfers/s per lane, depending on the version of PCIe being used).

However, in some application environments and in some situations, the prior art SSD control techniques are inadequate. For example, consider a workload which consists predominantly of back to back and continuous write transfers, which might require an equivalent number of erase operations. This situation will cause much more power to be consumed than back to back continuous read transfers. Given that the SSD is a slave to the demands of the host in terms of the workload, it is entirely possible that without throttling, this workload could cause the SSD to exceed the maximum rated power for its form factor, or for the temperature of the flash controller to exceed its rated maximum. Thus, dynamic throttling helps the SSD to adapt to unusual workloads.

Another aspect of an embodiment of the present invention is that throttling may be applied to environments in which there is a high variability in ambient temperature and variable traffic. The ambient temperature may vary for any reason, including the proximity of other electric equipment or problems with a local cooling system.

Yet another aspect of an embodiment of the present invention is that it facilitates operation of a SSD in demanding environments and applications. As one example, in enterprise applications there may be racks of SSDs. As another example, in a data center there may be close proximity of the SSDs. In these examples, there are multiple SSDs in close proximity. This creates several problems, including the problems of high heat and supplying power to the SSDs. Providing autonomous, dynamic control within each SSD helps with thermal management. Improved, multiple SSDs may be driven off a common power source. Consequently, throttling may improve power management across multiple SSDs and thus reduce power supply requirements of a common power supply.

Additionally, as the performance of an SSD depends on temperature, improved temperature control is advantageous to avoid temperature spikes that can degrade overall performance.

Exemplary Pseudo-Code

The PID controller may be implemented in firmware or software. An exemplary pseudo code implementation is as follows Initial Conditions:
DifferentialError=0
IntegralError=0
The loop Executes every dt seconds
Error=SetPoint−MeasuredValue
IntegralError=IntegralError+Error*dt
DifferentialError=(Error−DifferentialError)/dt
Output=Kp*Error+Ki*IntegralError+
    Kd*DifferentialError
DifferentialError=Error While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of controlling a solid state drive, comprising:
    measuring either a temperature of the solid state drive using a temperature sensor or a power consumed by the solid state drive using a power sensor;
    determining a value for an amount of throttling to be applied to a non-volatile memory array of the solid state drive, the value calculated as a function of a difference between the measured temperature or the measured power of the solid state drive and a target temperature setting or a power setting, respectively, wherein the value corresponds to the precise amount of throttling required to converge the measured temperature or the measured power of the solid state drive on the target temperature setting or the power setting, respectively;
    setting an amount of throttling according to the value; and
    throttling the solid state drive with the set amount of throttling.

2. The method of claim 1, wherein throttling the solid state drive comprises adjusting a rate of concurrent non-volatile memory operations between a minimum value and a maximum value.

3. The method of claim 2, wherein the minimum value is selected to be a minimum value for normal operation of a host platform.

4. The method of claim 1, wherein throttling the solid state drive comprises adjusting a rate of non-volatile memory operations based on the operation type for each memory bus channel.

5. The method of claim 2, wherein the throttling is selected by a control loop to protect the solid state drive from overheating and to keep the solid state drive under a power requirement.

6. The method of claim 5, wherein the control loop is a proportional integral differential (PID) control loop.

7. The method of claim 6, wherein PID control loop includes in each loop: getting current temperature and power values, determining a PID throttle value, and setting a differential error value and an integral error value for the next loop.

8. The method of claim 5, wherein the control loop comprises a first proportional integral differential (PID) control loop to generate a first throttle value based on temperature and a second PID control loop to generate a second throttle value based on power and the throttle setting is selected to be a maximum of the first throttle value and the second throttle value.

9. The method of claim 1, wherein the non-volatile memory is a flash memory array.

10. The method of claim 1, wherein the calculation uses the mathematical formula:

$$u(t) = K_p e(t) + K_i \int_0^t e(\tau) d\tau + K_d \frac{d}{dt} e(t)$$

wherein u(t) is the value for the amount of throttling,
$K_p$ is a proportional gain tuning parameter,
$K_i$ is an integral gain tuning parameter,
$K_d$ is a differential gain tuning parameter,
e is an error value,
t is time, and
τ is a variable of integration.

11. A solid state drive (SSD), comprising:
    a non-volatile memory array;
    a solid state drive controller;
    a monitoring system to measure either a temperature of the solid state drive using a temperature sensor, or a power consumed by the solid state drive using a power sensor;
    at least one control loop to determine a value for an amount of throttling to be applied to the non-volatile memory, the value calculated as a function of a difference between the measured temperature or the measured power of the solid state drive and a target temperature setting or a power setting, respectively, wherein the value corresponds to the precise amount of throttling required to converge the measured temperature or the measured power of the solid state drive on the target temperature setting or the power setting, respectively; and a throttling unit to set an amount of throttling according to the value, and to throttle the solid state drive with the set amount of throttling.

12. The solid state drive of claim 11, wherein the control loop is a proportional integral differential (PID) control loop.

13. The solid state drive of claim 11, wherein the non-volatile memory array is a flash memory array.

14. The solid state drive of claim 11, wherein the solid state drive controller is further adapted to receive power state commands from a host.

15. The solid state drive of claim 11, wherein throttling the solid state drive comprises adjusting a rate of concurrent flash operations between a minimum value and a maximum value.

16. The solid state drive of claim 15, wherein the minimum value is selected to be a minimum value for normal operation of the host platform.

17. The solid state drive of claim 11, wherein the solid state drive controller, monitoring system, control loop, and throttling unit provide autonomous local control of power settings of the solid state drive.

18. The solid state drive of claim 17, wherein the solid state drive is compatible with host commands to adjust power and includes an input to receive a power state control command from a host and an output to provide performance statistics to the host.

19. The solid state drive of claim 18, wherein the SSD is compatible with the NVM Express (NVMe) specification.

20. The solid state drive of claim 11, wherein the at least one control loop comprises a first proportional integral differential (PID) control loop to generate a first throttle value based on temperature and a second PID control loop to generate a second throttle value based on power and the throttle setting is a maximum of the first throttle value and the second throttle value.

21. The solid state drive of claim 11, wherein the value for the amount of throttling is calculated using the mathematical formula:

$$u(t) = K_p e(t) + K_i \int_0^t e(\tau) d\tau + K_d \frac{d}{dt} e(t)$$

wherein u(t) is the value for the amount of throttling,
$K_p$ is a proportional gain tuning parameter,
$K_i$ is an integral gain tuning parameter,
$K_d$ is a differential gain tuning parameter,
e is an error value,
t is time, and
$\tau$ is a variable of integration.

22. A method of controlling a solid state drive, comprising:

receiving, at the solid state drive, a control command indicative of a target power setting;
providing local autonomous control, by the solid state drive, of temperature and power, including:
measuring, by the solid state drive, either a temperature of the solid state drive using a temperature sensor or a power consumed by the solid state drive using a power sensor;
determining, by at least one control loop of the solid state drive, a value for an amount of throttling to protect the solid state drive from overheating and to keep the solid state drive under a power requirement of the host platform, the value calculated as a function of a difference between the measured temperature or the measured power of the solid state drive and a target temperature setting or a power setting, respectively, wherein the value corresponds to the precise amount of throttling required to converge the measured temperature or the measured power of the solid state drive on the target temperature setting or the power setting, respectively;
setting, by a throttling unit, an amount of throttling according to the value, and throttling the solid state drive with the set amount of throttling.

23. The method of claim 22 wherein throttling the solid state drive comprises adjusting a number of concurrent flash operations per unit time between a minimum value and a maximum value.

24. The method of claim 23, wherein the minimum value is selected to be a minimum value for normal operation of the host platform.

25. The method of claim 22, wherein the at least one control loop comprises at least one proportional integral differential (PID) control loop.

26. The method of claim 25, wherein the at least one PID control loop includes in each loop: getting current temperature and power values, determining a throttle value, and setting a differential error value and an integral error value for the next loop.

27. The method of claim 22, further comprising receiving, at the solid state drive, a control command indicative of a target power setting.

28. The method of claim 22, further comprising receiving, at the solid state drive, a control command indicative of a target temperature setting.

29. The method of claim 22, wherein the at least one control loop comprises a first control loop to generate a first throttle value based on temperature and a second control loop to generate a second throttle value based on power and the throttle setting is a maximum of the first throttle value and the second throttle value.

30. The method of claim 22, wherein the at least one control loop comprises a first proportional integral differential (PID) control loop to generate a first throttle value based on temperature and a second PID control loop to generate a second throttle value based on power and the throttle setting is a maximum of the first throttle value and the second throttle value.

31. The method of claim 22, wherein the calculation uses the mathematical formula:

$$u(t) = K_p e(t) + K_i \int_0^t e(\tau) d\tau + K_d \frac{d}{dt} e(t)$$

wherein u(t) is the value for the amount of throttling,
$K_p$ is a proportional gain tuning parameter,
$K_i$ is an integral gain tuning parameter,
$K_d$ is a differential gain tuning parameter,
e is an error value,
t is time, and
$\tau$ is a variable of integration.

* * * * *